Jan. 25, 1955  J. B. CATALDO  2,700,752
ELECTRICAL OUTLET FIXTURE FOR RECEIVING ATTACHMENT PLUGS
Filed March 28, 1951
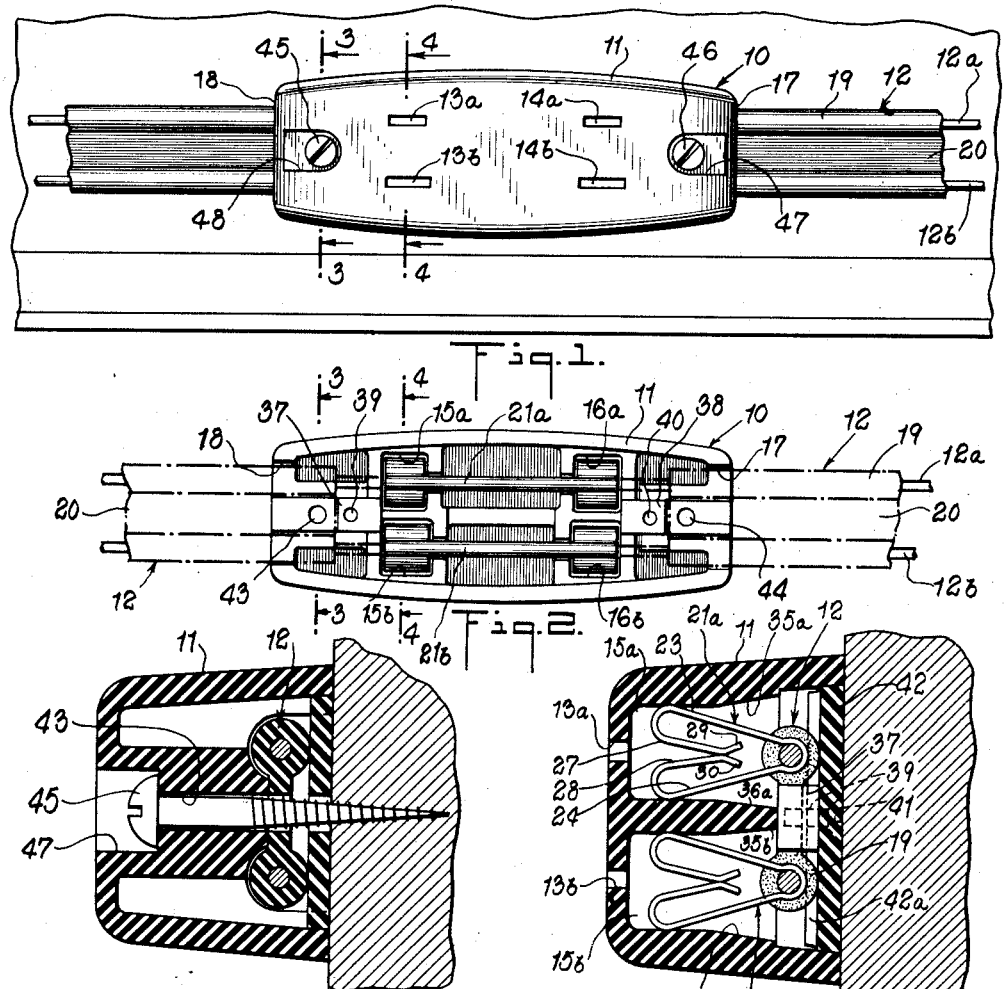
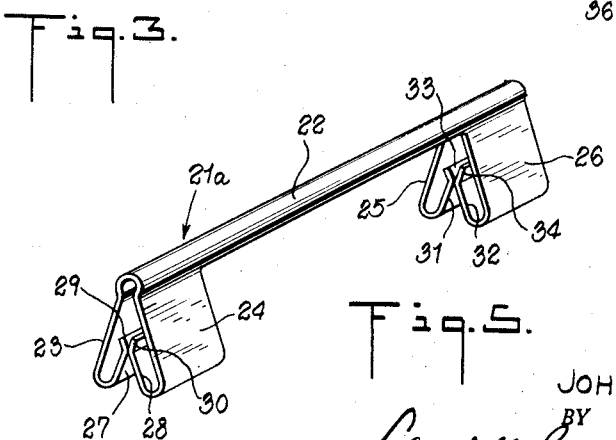
INVENTOR.
JOHN B. CATALDO
BY
Campbell, Brumbaugh, Free & Graves
HIS ATTORNEYS

United States Patent Office 2,700,752
Patented Jan. 25, 1955

2,700,752

ELECTRICAL OUTLET FIXTURE FOR RECEIVING ATTACHMENT PLUGS

John B. Cataldo, Bernardsville, N. J., assignor to John B. Pierce Foundation, New York, N. Y., a corporation of New York Application March 28, 1951, Serial No. 218,023

1 Claim. (Cl. 339—164)

This invention relates to electrical outlet fixtures and more particularly to an improved and simplified fixture of high electrical and mechanical efficiency adapted to be attached to electrical conduits of heavy current-carrying capacity.

The development of electrical outlet fixtures has been carried out to a high degree, it being desired to achieve designs which meet preestablished standards of safety and efficiency, but which nevertheless are simple to install and economical to manufacture. A particular demand has been established for outlet fixtures which do not require the severing of the electrical conductors of the conduit and which may be used either as dead end units or as units intermediate of the termini of the conduit.

Accordingly it is one object of the invention to provide an improved outlet fixture or receptacle adapted to be separably attached to an electrical conduit and to receive conventional cord caps or plugs in an efficient, safe connection.

It is another object of the invention to provide a highly simplified and mechanically improved outlet fixture which may be conveniently attached to the conductors of an electrical conduit without the use of special tools, the improved design being such that relatively large electrical power loads may be accommodated thereby.

It is a further object of the invention to provide an outlet fixture adapted to receive cord cap plugs and which is formed of a minimum number of parts, the electrically conducting components of which may be formed without costly machining operations such as tapping and the like.

According to a preferred embodiment of the invention there is provided an outlet fixture having a shell portion formed of dielectric material and molded as a unit having openings for receiving the blades of a cord cap plug and internal recesses communicating therewith for receiving electrically conducting clip members adapted to be engaged by the blades. The fixture is adapted to be attached to an electrical conduit having two or more conductors and may be attached thereto either as a dead-end unit or at any point intermediate the ends of the conductor. The electrically conducting clip members correspond in number to the electrical conductors of the conduit, and each clip member is formed of a single piece of resilient conducting material folded on a longitudinal axis to embrace a conductor of the conduit. One or more pairs of cooperating leg portions diverge outwardly from the fold axis and are adapted to be received in the internal recess in the housing. The outer ends of each pair of divergent leg portions are inturned to form the blade engaging contacts.

In assembling the fixture a clip is fitted on each conductor and the pairs of leg portions are pressed into corresponding recesses in the shell portion to clamp the clip tightly about the conductor and to cause the leg portions to be compressed so as to secure the clip tightly in the housing. The inturned portions which form the contacts for receiving the blades of the cord cap are relatively long and comprise cantilever arms spring-biased toward each other so that the presence of a blade of a cord cap may establish bending or yielding of the cantilever arms which is not felt in the connection between the clip and the conductor of the conduit. The fixture may be provided with a backing portion formed with transverse abutments for engaging the clip members adjacent the conductors of the conduit to which they are attached, thereby to buttress the mechanical assembly. As an additional feature the recesses in which the clip members are set are formed with tapering outer walls followed by parallel inner walls. The tapered walls serve to pilot the leg portions as they are inserted in the recess and to compress them, whereas the parallel wall portions afford uniform compressing action and, if required, serve to prevent unauthorized movement of the clip in the housing.

Thus the design of the clip members is such that plural functions are performed there, namely, the establishing of a tight electrical and mechanical connection between the clips and the electrical conductors of the conduit, frictionally holding the clips in position in the shell portion, and establishing an electrically and mechanically efficient receptacle for the blades of the cord cap. According to the invention the fixture may be readily formed to receive one or more cord cap plugs without necessitating the use of additional clip members, and, moreover, the design readily lends itself to the use of polarized plugs.

The invention and additional features and objects thereof may be more fully understood from the following description of a preferred embodiment of the invention, referring to the accompanying drawings in which Fig. 1 is a top view of an electrical outlet fixture formed according to the invention and shown attached to an electrical conduit between the terminal points thereof;

Fig. 2 is a view of the back of the outlet fixture and conduit assembly of Fig. 1, with the back cover plate removed to show the mechanical assembly;

Fig. 3 is a view in transverse section in enlarged scale taken on the line 3—3 of Figs. 1 and 2 looking in the direction of the arrows;

Fig. 4 is a view in transverse section in enlarged scale taken on the line 4—4 of Figs. 1 and 2 looking in the direction of the arrows; and Fig. 5 is a perspective view in enlarged scale of a clip member used in the fixture assembly.

The invention is shown as embodied in an outlet fixture or receptacle 10 housed in an insulating shell 11 and adapted to be detachably connected to an electrical conduit 12 having two spaced conductors 12a and 12b. The fixture receives conventional cord cap plugs (not shown), the pairs of conductor blades of which are inserted in corresponding pairs of blade receiving openings 13a, 13b and 14a, 14b formed in the outer surface of the housing shell.

The shell 11 may be molded as a single piece from a suitable dielectric material such as plastic, for example, and is formed with an open back having two pairs of recesses 15a, 15b and 16a, 16b communicating with the blade receiving openings 13a, 13b and 14a, 14b, respectively. The shell may be molded with both of its ends closed by a thin, frangible wall which may be broken out on one end to form a channel 17 to receive the electrical conduit 12 as a dead-end unit (not shown) or, alternatively, both ends may be knocked out to form channels 17 and 18, in which case the conduit may pass through the fixture, as shown in the drawing. The housing shell 11, between the recesses 15a, 15b, and 16a, 16b, is preferably hollowed out to reduce weight and conserve material.

The spaced conductors 12a and 12b of the electrical conduit 12 may comprise heavy monofilament wire such as No. 12 wire for example, covered by a flexible, molded insulation 19 having a central spacing web 20. The insulated portion of the conduit may be accommodated for a short distance in the channels 17 and 18. Within the fixture, however, the conduit is stripped of its insulation so that the parallel conductors 12a and 12b are bare. If the fixture is a dead-end unit, the bare wire ends of course terminate within the fixture. If, however, as shown in the drawing, the conduit continues out the other end of the fixture, it will be noted that only the insulation need be cut, the conductors themselves being continuous.

Within the fixture and adapted to afford the electrical conducting medium between the conductors 12a and 12b of the conduit and the cord cap blades, which may be inserted into the fixture, are a pair of clip members 21a and 21b formed of suitable resilient, electrically conducting material such as Phosphor bronze, for example. The clip members 21a and 21b are substantially identical and only one need be described in detail herein.

The clip member 21a (Fig. 5) is formed of a single piece of sheet material having a body portion including a longitudinal fold edge 22 the radius of curvature of which is such that it may comfortably receive the conductor 12a of the electrical conduit 12. Preferably the fold edge is shaped to embrace the conductors over an arc exceeding 180°. Formed integrally with the fold edge 22 of the clip member are leg portions 23—24 and 25—26, arranged in pairs at opposite ends thereof, the two legs of each pair being outwardly divergent from the axis of the fold edge. The free ends of each of the legs 23 and 24 are bent inwardly on a relatively generous radius to form a pair of inwardly converging, blade receiving contact elements 27 and 28, respectively. The converging contact elements 27 and 28 form a channel for receiving one blade of a cord cap plug, and may be flared outwardly at their respective inner ends 29 and 30. The inturned contact elements should be made as long as possible to afford good springing action for purposes described more fully below. In a like manner the leg portions 25 and 26 are formed with inturned, converging contact elements 31 and 32 having outwardly flared tips 33 and 34.

In assembling the clip members in the fixture, each is fitted over its corresponding conductor, which is stripped of insulation, so that the conductor is received in the fold edge. The clip is then inserted in the housing shell so that each pair of opposed, divergent leg portions is received in a corresponding recess. Thus in the drawing the leg portions 23—24 of the clip member 21a are received in the recess 15a and the leg portions 25, 26 in the recess 16a.

In order to pilot or guide the leg portions into the respective recess, a portion of each recess is formed with inwardly converging walls. Thus, as best seen in Fig. 4, the opposed walls 35a and 36a of the recess 15a taper inwardly. Within the recess, however, the walls are parallel and are spaced apart for a distance which affords the desired compressing action on the leg portions so that opposed contact elements may be pressed into yieldable engagement for the purpose of forming a good contact with the cord cap blade when the latter is inserted. Also the springing action of the leg portions serves to anchor the clip members tightly in position in the housing shell. Moreover, in being forced into the recess, the leg portions are compressed so as to cause the fold edge of the clip member to clamp more tightly about the electrical conductor, thereby to improve the electrical contact therewith.

When a cord cap blade is forced between a pair of opposed contact elements spreading takes place, the contact elements bending along their length and about the gently curved outer ends of the leg portions. By virtue of the design of the contact elements the bending action may occur without adversely affecting the tight clamping engagement of the fold axis of the clip member about the conductor. Also the resilience of the contact elements serves to wipe the conductor blade of the cord cap as it is inserted therebetween, and in this fashion an improved electrical connection may be established. The flared inner ends of the opposed contact elements serve to prevent binding of the blade at the time it is withdrawn.

The housing shell is formed with internal bosses 37 and 38 against which the web 20 of the conduit insulation abuts. The bosses 37 and 38 are formed with tapped bores 39 and 40, respectively, which receive screws 41 (Fig. 4) for holding an insulating back cover plate 42 in position. The cover plate 42 overlies the insulating material of the conduit which is received within channels in the ends of the housing. In order that the clip members 21a and 21b may be supported in their positions on the conductors 12a and 12b, one or more transverse rib portions 42a may be formed on the inner surface of the cover plate 42, which rib portions are of suitable depth to engage the fold edges of the clip members. In this fashion the clip members may not be inadvertently forced off of the conductors to which they attach.

If it is desired, as shown in the illustrated embodiment of the invention, to attach the fixture to an external supporting surface such as a base board, for example, through-bores 43 and 44 may be formed in the housing for receiving mounting screws 45 and 46, respectively (Figs. 1 and 3), the heads of which are received in recesses 47 and 48, respectively, formed in the outer surface of the housing. As best seen in Fig. 3, the mounting screw 45 penetrates the web 20 of the insulating material on the conduit and in so doing secures the web to the fixture so that the insulation on the conduit may not readily be worked backwardly on the conductors to expose the latter externally of the fixture.

From the foregoing description it will be understood that an efficient and simplified outlet fixture may be provided according to the invention. It will also be understood that the embodiment of the invention described above is merely illustrative of the invention, and that the illustrated form thereof may be modified in certain respects without departing from the spirit of the invention. Thus, for example, it will be apparent that the recesses 15a and 16a which receive the clip member 21a and which are shown as two separate recesses in the drawing may be formed as a single enlarged recess by eliminating the inner walls between the two pairs of leg portions. The tapered and parallel side walls should of course be preserved. The use of separate recesses serves primarily to provide additional internal walls to strengthen the housing shell. Accordingly the invention should not be limited save as defined in the following claim.

What is claimed is:

An electrical outlet fixture for receiving cord cap plugs and the like and adapted to be separably attached at any selected place, to an electrical conduit comprising two spaced-apart parallel conductors covered with a removable insulation material, the fixture comprising an electrically insulated housing having openings formed in its front surface for receiving the electrically conducting blades of cord caps, said housing being formed on its back surface with wall means defining a channel for receiving said conduit, said conduit being adapted to be stripped of its insulating material for a distance less than the length of the housing, said housing being formed internally with a plurality of clip receiving recesses, one communicating with each blade receiving opening, each recess having inwardly convergent walls followed by substantially parallel inner walls, a plurality of clip members corresponding in number to the electrical conductors of the conduit, each clip member comprising a unitary element formed of resilient electrically conducting material and including a body portion folded on an axis which when the fixture is attached to the conduit is coincident with the axis of the particular electrical conductor of the conduit to which it attaches, one or more pairs of cooperating leg portions formed integrally with the body portion of the clip member and diverging outwardly from the fold axis, the outer ends of each pair of leg portions being spaced apart for a distance exceeding the spacing of the parallel wall means of the corresponding clip receiving recess, a contact element for engaging the blade of a cord cap formed integrally with each leg portion, said contact element comprising an elongated inturned end portion of the leg portion supported by the outer end of the leg portion as a cantilever, the inturned end portions of each pair of cooperating leg portions being convergent toward the fold axis to form a cord cap blade receiving channel, each clip member being adapted to be inserted in the housing with its fold axis embracing a conductor of the conduit and so that each pair of cooperating leg portions is received in a recess first to be piloted and pressed together by the inwardly convergent walls of the recess and then to be disposed between the inner walls of the recess to anchor the clip member in the housing and to tighten about the conductor of the conduit the portion of the clip member which is folded about the conductor of the conduit, a backing portion adapted to be attached to the back surface of the housing and to overlie the insulating material of the conduit and offset abutment means formed on the inner surface of the backing member to engage the folded portion of the clip member when the backing portion is attached to the housing, thereby to hold the clip member in position against displacement when the cord cap plug is inserted into the outlet fixture.

References Cited in the file of this patent

UNITED STATES PATENTS

| | | |
|---|---|---|
| 1,583,884 | Ile | May 11, 1926 |
| 1,794,359 | Bockius et al. | Mar. 3, 1931 |
| 2,274,089 | O'Brien | Feb. 2, 1942 |
| 2,517,593 | O'Brien et al. | Aug. 8, 1950 |
| 2,567,961 | O'Brien et al. | Sept. 18, 1951 |